US011878928B2

(12) United States Patent
Phenes et al.

(10) Patent No.: US 11,878,928 B2
(45) Date of Patent: Jan. 23, 2024

(54) METHODS OF PROCESSING A VISCOUS RIBBON

(71) Applicant: Corning Incorporated, Corning, NY (US)

(72) Inventors: Craig Marshall Phenes, Danville, KY (US); Robert Wendell Sharps, Corning, NY (US); Nicholas Leon Susch, Painted Post, NY (US); Lianggong Wen, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 283 days.

(21) Appl. No.: 17/428,139

(22) PCT Filed: Jan. 16, 2020

(86) PCT No.: PCT/US2020/013796
§ 371 (c)(1),
(2) Date: Aug. 3, 2021

(87) PCT Pub. No.: WO2020/163054
PCT Pub. Date: Aug. 13, 2020

(65) Prior Publication Data
US 2022/0127180 A1    Apr. 28, 2022

Related U.S. Application Data

(60) Provisional application No. 62/801,835, filed on Feb. 6, 2019.

(51) Int. Cl.
*G03B 13/04*    (2021.01)
*C03B 13/04*    (2006.01)
*G01N 21/896*    (2006.01)

(52) U.S. Cl.
CPC ........... *C03B 13/04* (2013.01); *G01N 21/896* (2013.01); *C03B 2215/404* (2013.01)

(58) Field of Classification Search
CPC ... C03B 13/04; C03B 2215/404; C03B 13/00; G01N 21/896; C03C 23/0005
See application file for complete search history.

(56) References Cited

U.S. PATENT DOCUMENTS 1,928,289 A    9/1933  Henry et al.
5,170,060 A    12/1992 Maillard et al.
(Continued)

FOREIGN PATENT DOCUMENTS

CN    103250047 A    8/2013
CN    104111040 A    10/2014
(Continued)

OTHER PUBLICATIONS

International Search Report and Written Opinion of the International Searching Authority; PCT/US2020/013796; dated Jun. 4, 2020; 11 pages; European Patent Office.
(Continued)

*Primary Examiner* — Tony Ko
(74) *Attorney, Agent, or Firm* — Kevin M. Able

(57) ABSTRACT

Methods of processing a viscous ribbon include supplying a molten material from a supply vessel. Methods include forming the molten material into the viscous ribbon. The viscous ribbon travels along a travel path. Methods include receiving thermal light energy produced from the viscous ribbon. Methods include generating an image of the viscous ribbon from the thermal light energy. Methods include detecting a defect of the viscous ribbon from the image.

19 Claims, 9 Drawing Sheets

(56) References Cited

U.S. PATENT DOCUMENTS

| | | | |
|---|---|---|---|
| 5,583,337 | A | 12/1996 | Chan |
| 7,283,227 | B2 | 10/2007 | Dureiko |
| 7,420,671 | B2 | 9/2008 | Sonda |
| 7,929,129 | B2 | 4/2011 | Berg et al. |
| 7,937,233 | B2 | 5/2011 | Floeder et al. |
| 8,149,376 | B2 | 4/2012 | Ohashi |
| 8,238,646 | B2 | 8/2012 | Floeder et al. |
| 8,803,968 | B2 | 8/2014 | Kim et al. |
| 8,820,118 | B2 | 9/2014 | Ahrens et al. |
| 9,031,312 | B2 | 5/2015 | Ribnick et al. |
| 9,389,187 | B2 | 7/2016 | Furnas |
| 9,546,967 | B2 | 1/2017 | Schrader et al. |
| 9,683,945 | B2 | 6/2017 | Kang et al. |
| 2014/0137601 | A1 | 5/2014 | Aburada et al. |
| 2014/0174127 | A1 | 6/2014 | Dalstra |
| 2018/0297884 | A1 * | 10/2018 | Aburada ............... C03B 17/067 |

FOREIGN PATENT DOCUMENTS

| | | |
|---|---|---|
| CN | 108137367 A | 6/2018 |
| JP | 11-014334 A | 1/1999 |
| JP | 3332208 B2 | 10/2002 |
| JP | 2007-132930 A | 5/2007 |
| JP | 2009-276088 A | 11/2009 |
| JP | 2018-529615 A | 10/2018 |
| KR | 10-0663460 B1 | 1/2007 |
| TW | 201725184 A | 7/2017 |
| WO | 2012/077683 A1 | 6/2012 |

OTHER PUBLICATIONS

Martin et al., "Shrinkage of an oxygen bubble rising in a molten glass", Chemical Engineering Science, vol. 65, Issue 10, May 2010, pp. 3158-3168.

Chinese Patent Application No. 202080019575.1, Office Action dated Feb. 2, 2023, 5 pages (English Translation only), Chinese Patent Office.

Taiwanese Patent Application No. 109103152, Office Action dated Oct. 11, 2023, 3 pages (English Translation Only), Taiwanese Patent Office.

* cited by examiner

METHODS OF PROCESSING A VISCOUS RIBBON

CROSS-REFERENCE TO RELATED APPLICATIONS

This application is a national stage application under 35 U.S.C. § 371 of International Application No. PCT/US2020/013796, filed on Jan. 16, 2020, which claims the benefit of priority of U.S. Provisional Application Ser. No. 62/801,835 filed on Feb. 6, 2019 the contents of which are relied upon and incorporated herein by reference in their entirety as if fully set forth below.

FIELD

The present disclosure relates generally to methods for processing a viscous ribbon and, more particularly, to methods for processing a viscous ribbon with an image.

BACKGROUND

It is known to generate an image of a glass ribbon with a camera. The image is inspected to identify any defects within the glass ribbon. However, certain types of defects, for example, inclusions within the glass ribbon, have been difficult to identify with the camera. Further, it has been difficult to separate defects from artifacts within the image. As a result, inspection of the images generated by the camera may allow for some types of defects to be identified, while allowing other types of defects to go undetected.

SUMMARY

The following presents a simplified summary of the disclosure to provide a basic understanding of some embodiments described in the detailed description.

In accordance with some embodiments, methods of processing a viscous ribbon can comprise supplying a molten material from a supply vessel. Methods can comprise forming the molten material into the viscous ribbon, with the viscous ribbon traveling along a travel path. Methods can comprise receiving thermal light energy produced from the viscous ribbon. Methods can comprise generating an image of the viscous ribbon from the thermal light energy. Methods can comprise detecting a defect of the viscous ribbon from the image.

In some embodiments, the generating the image of the viscous ribbon comprises rectifying the image to a perspective that is orthogonal to a plane defined by the viscous ribbon.

In some embodiments, the detecting the defect of the viscous ribbon comprises determining if the defect is an inclusion within the viscous ribbon or a surface characteristic at a major surface of the viscous ribbon.

In some embodiments, the detecting the defect of the viscous ribbon comprises determining a position of the defect.

In some embodiments, methods can comprise tracking a first segment of the viscous ribbon, which comprises the defect.

In some embodiments, the tracking the first segment comprises measuring a first velocity of the viscous ribbon.

In some embodiments, methods can comprise removing the first segment from the viscous ribbon downstream from a portion of the viscous ribbon that is imaged.

In some embodiments, methods can comprise generating the thermal light energy from one or more of the viscous ribbon or the supply vessel.

In accordance with some embodiments, methods of processing a viscous ribbon can comprise supplying a molten material from a supply vessel. Methods can comprise forming the molten material into the viscous ribbon, the viscous ribbon traveling along a travel path. Methods can comprise receiving thermal light energy produced from the viscous ribbon. Methods can comprise generating an image of the viscous ribbon from the thermal light energy. Methods can comprise identifying an area of interest in the image. Methods can comprise determining if the area of interest comprises a defect of the viscous ribbon.

In some embodiments, the determining if the area of interest comprises the defect comprises measuring a first velocity of the viscous ribbon and a second velocity of the area of interest.

In some embodiments, if the first velocity is substantially equal to the second velocity, then classifying the area of interest as comprising the defect.

In some embodiments, the determining if the area of interest comprises the defect comprises identifying the area of interest in consecutive images of the viscous ribbon.

In some embodiments, if the area of interest is in consecutive images of the viscous ribbon, then classifying the area of interest as comprising the defect.

In some embodiments, methods can comprise separating the viscous ribbon downstream from a portion of the viscous ribbon that is imaged.

In some embodiments, methods can comprise generating the thermal light energy from one or more of the viscous ribbon or the supply vessel.

In some embodiments, the generating the image of the viscous ribbon comprises rectifying the image to a perspective that is orthogonal to a plane defined by the viscous ribbon.

In accordance with some embodiments, methods of processing a viscous ribbon can comprise moving the viscous ribbon along a travel path in a travel direction. Methods can comprise receiving thermal light energy produced from the viscous ribbon. Methods can comprise generating an image of the viscous ribbon from the thermal light energy. Methods can comprise detecting a defect of the viscous ribbon from the image. Methods can comprise removing from the viscous ribbon a first segment of the viscous ribbon that comprises the defect.

In some embodiments, methods can comprise tracking the first segment by measuring a first velocity of the viscous ribbon.

In some embodiments, the detecting the defect of the viscous ribbon comprises determining if the defect is an inclusion within the viscous ribbon or a surface characteristic at a major surface of the viscous ribbon.

In some embodiments, the detecting the defect of the viscous ribbon comprises determining a position of the defect.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
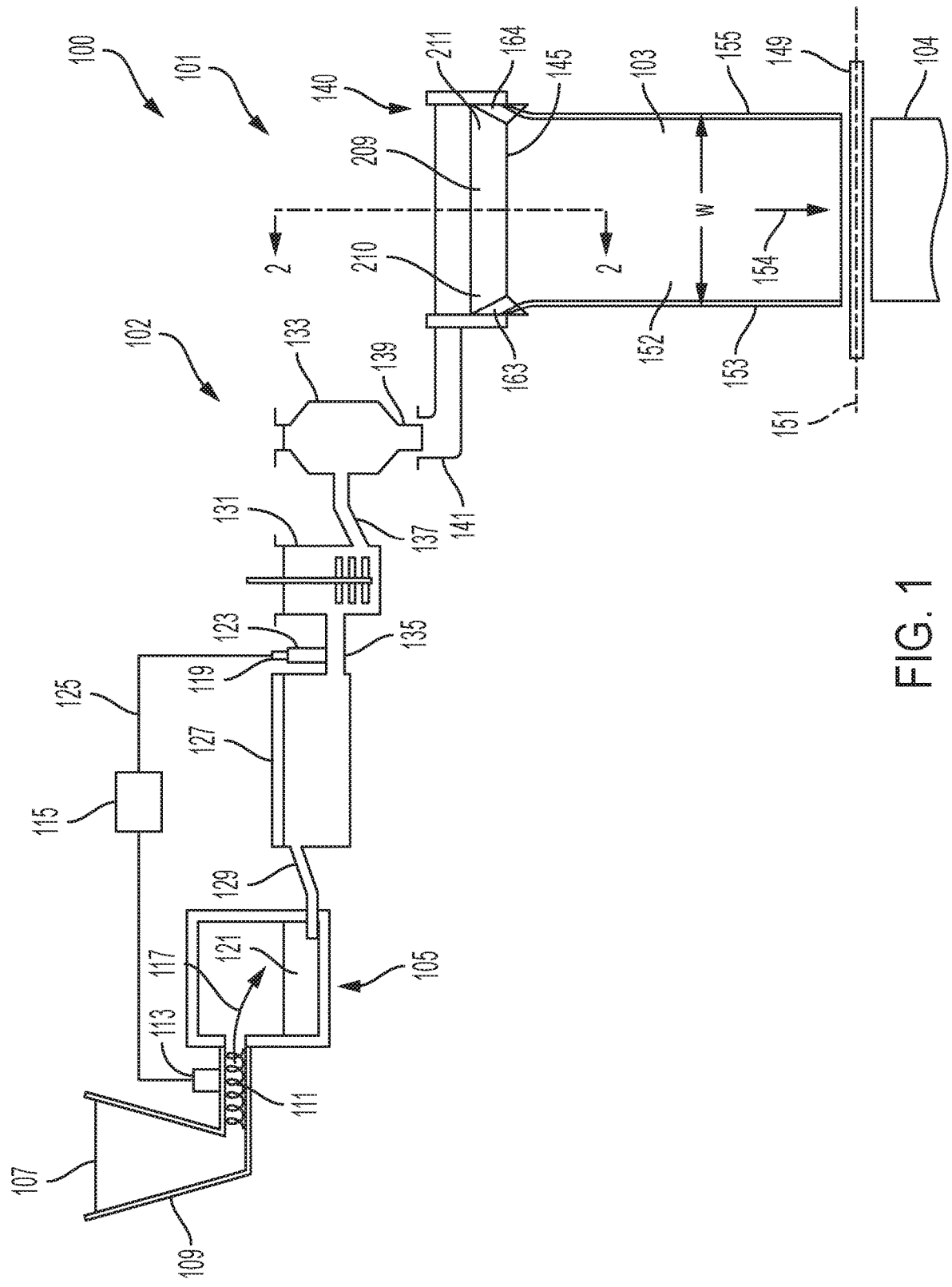
FIG. 1 schematically illustrates example embodiments of a glass forming apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a viscous ribbon processing apparatus and methods of processing a viscous ribbon. Methods and apparatus for processing a viscous ribbon will now be described by way of example embodiments for forming a viscous ribbon from a quantity of molten material. As schematically illustrated in FIG. 1, in some embodiments, an exemplary glass manufacturing apparatus 100 can comprise a glass melting and delivery apparatus 102 and a forming apparatus 101 comprising a supply vessel 140 designed to produce a ribbon 103 from a quantity of molten material 121. In some embodiments, the ribbon 103 can comprise a central portion 152 positioned between opposite edge portions (e.g., edge beads) formed along a first outer edge 153 and a second outer edge 155 of the ribbon 103, wherein a thickness of the edge beads can be greater than a thickness of the central portion. Additionally, in some embodiments, a separated glass ribbon 104 can be separated from the ribbon 103 along a separation path 151 by a glass separator 149 (e.g., scribe, score wheel, diamond tip, laser, etc.). In some embodiments, before or after separation of the separated glass ribbon 104 from the ribbon 103, the edge beads formed along the first outer edge 153 and the second outer edge 155 can be removed to provide the central portion 152 as a high-quality separated glass ribbon 104 having a uniform thickness.

In some embodiments, the glass melting and delivery apparatus 102 can comprise a melting vessel 105 oriented to receive batch material 107 from a storage bin 109. The batch material 107 can be introduced by a batch delivery device 111 powered by a motor 113. In some embodiments, an optional controller 115 can be operated to activate the motor 113 to introduce a desired amount of batch material 107 into the melting vessel 105, as indicated by arrow 117. The melting vessel 105 can heat the batch material 107 to provide molten material 121. In some embodiments, a melt probe 119 can be employed to measure a level of molten material 121 within a standpipe 123 and communicate the measured information to the controller 115 by way of a communication line 125.

Additionally, in some embodiments, the glass melting and delivery apparatus 102 can comprise a first conditioning station comprising a fining vessel 127 located downstream from the melting vessel 105 and coupled to the melting vessel 105 by way of a first connecting conduit 129. In some embodiments, molten material 121 can be gravity fed from the melting vessel 105 to the fining vessel 127 by way of the first connecting conduit 129. For example, in some embodiments, gravity can drive the molten material 121 through an interior pathway of the first connecting conduit 129 from the melting vessel 105 to the fining vessel 127. Additionally, in some embodiments, bubbles can be removed from the molten material 121 within the fining vessel 127 by various techniques.

In some embodiments, the glass melting and delivery apparatus 102 can further comprise a second conditioning station comprising a mixing chamber 131 that can be located downstream from the fining vessel 127. The mixing chamber 131 can be employed to provide a homogenous composition of molten material 121, thereby reducing or eliminating inhomogeneity that may otherwise exist within the molten material 121 exiting the fining vessel 127. As shown, the fining vessel 127 can be coupled to the mixing chamber 131 by way of a second connecting conduit 135. In some embodiments, molten material 121 can be gravity fed from the fining vessel 127 to the mixing chamber 131 by way of the second connecting conduit 135. For example, in some embodiments, gravity can drive the molten material 121 through an interior pathway of the second connecting conduit 135 from the fining vessel 127 to the mixing chamber 131.

Additionally, in some embodiments, the glass melting and delivery apparatus 102 can comprise a third conditioning station comprising a delivery vessel 133 that can be located downstream from the mixing chamber 131. In some embodiments, the delivery vessel 133 can condition the molten material 121 to be fed into an inlet conduit 141. For example, the delivery vessel 133 can function as an accumulator and/or flow controller to adjust and provide a consistent flow of molten material 121 to the inlet conduit 141. As shown, the mixing chamber 131 can be coupled to the delivery vessel 133 by way of a third connecting conduit 137. In some embodiments, molten material 121 can be gravity fed from the mixing chamber 131 to the delivery vessel 133 by way of the third connecting conduit 137. For example, in some embodiments, gravity can drive the molten material 121 through an interior pathway of the third connecting conduit 137 from the mixing chamber 131 to the delivery vessel 133. As further illustrated, in some embodiments, a delivery pipe 139 can be positioned to deliver molten material 121 to forming apparatus 101, for example the inlet conduit 141 of the supply vessel 140.

Forming apparatus 101 can comprise various embodiments of supply vessels in accordance with embodiments of the disclosure, for example, forming apparatus 101 can comprise a supply vessel with a wedge for fusion drawing the ribbon, a supply vessel with a slot to slot draw the ribbon, or a supply vessel provided with press rolls to press roll the ribbon from the supply vessel. By way of illustration, the supply vessel 140 shown and disclosed below can be provided to fusion draw molten material 121 off a bottom edge, defined as a root 145, of a forming wedge 209 to produce a ribbon of molten material 121 that can be drawn into the ribbon 103. For example, in some embodiments, the molten material 121 can be delivered from the inlet conduit 141 to the supply vessel 140. The molten material 121 can then be formed into the ribbon 103 based, in part on the structure of the supply vessel 140. For example, as shown, the molten material 121 can be drawn off the bottom edge (e.g., root 145) of the supply vessel 140 along a draw path extending in a draw direction 154 of the glass manufacturing apparatus 100. In some embodiments, edge directors 163, 164 can direct the molten material 121 off the supply vessel 140 and define, in part, a width "W" of the ribbon 103. In some embodiments, the width "W" of the ribbon 103 extends between the first outer edge 153 of the ribbon 103 and the second outer edge 155 of the ribbon 103.

In some embodiments, the width "W" of the ribbon 103, which extends between the first outer edge 153 of the ribbon 103 and the second outer edge 155 of the ribbon 103, can be greater than or equal to about 20 millimeters (mm), for example, greater than or equal to about 50 mm, for example, greater than or equal to about 100 mm, for example, greater than or equal to about 500 mm, for example, greater than or equal to about 1000 mm, for example, greater than or equal to about 2000 mm, for example, greater than or equal to about 3000 mm, for example, greater than or equal to about 4000 mm, although other widths less than or greater than the widths mentioned above can be provided in further embodiments. For example, in some embodiments, the width "W" of the ribbon 103 can be from about 20 mm to about 4000 mm, for example, from about 50 mm to about 4000 mm, for example, from about 100 mm to about 4000 mm, for example, from about 500 mm to about 4000 mm, for example, from about 1000 mm to about 4000 mm, for example, from about 2000 mm to about 4000 mm, for example, from about 3000 mm to about 4000 mm, for example, from about 20 mm to about 3000 mm, for example, from about 50 mm to about 3000 mm, for example, from about 100 mm to about 3000 mm, for example, from about 500 mm to about 3000 mm, for example, from about 1000 mm to about 3000 mm, for example, from about 2000 mm to about 3000 mm, for example, from about 2000 mm to about 2500 mm, and all ranges and subranges therebetween.

Figure 2:
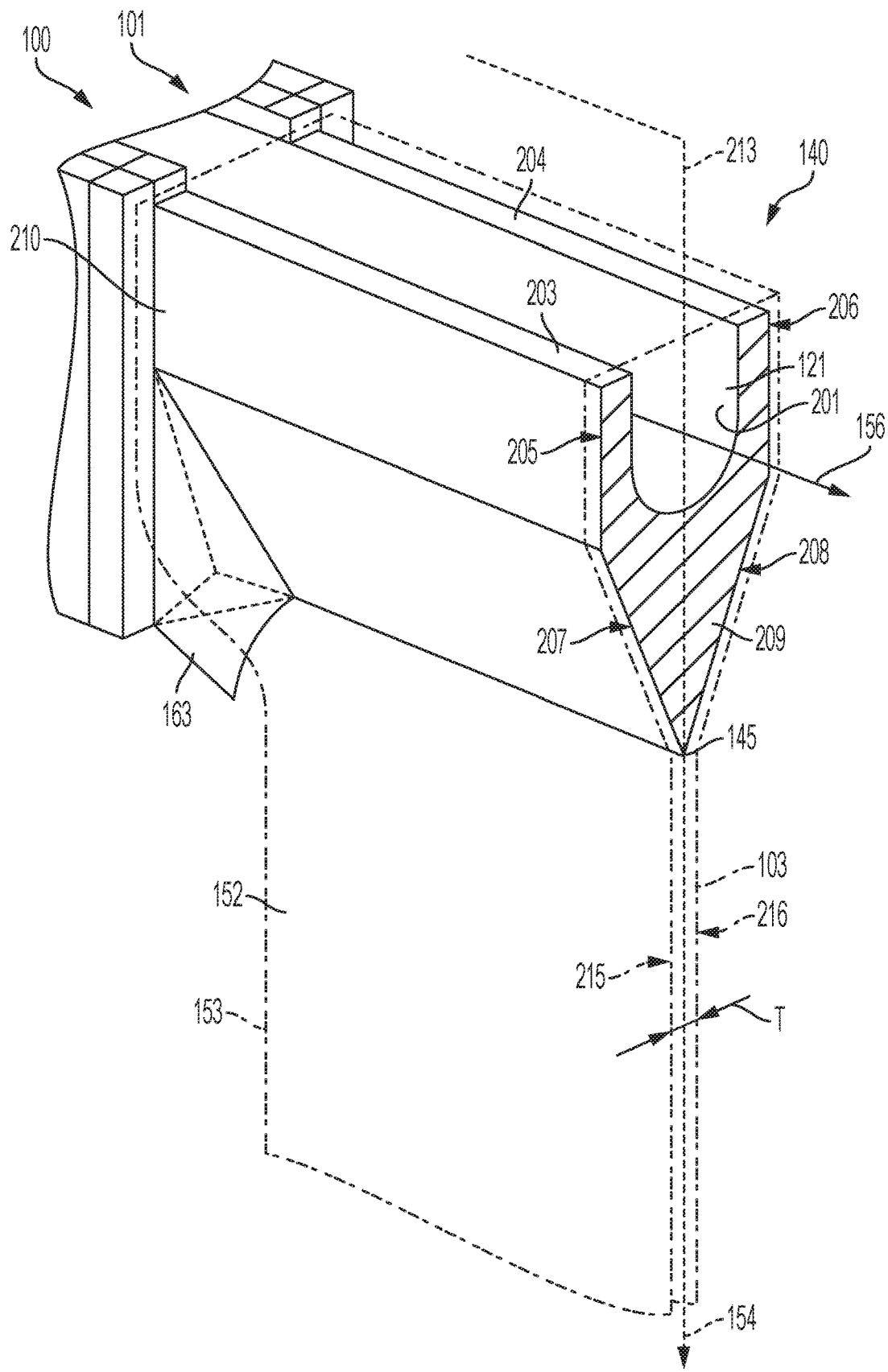
FIG. 2 illustrates a perspective cross-sectional view of the glass forming apparatus along line 2-2 of FIG. 1 in accordance with embodiments of the disclosure.

FIG. 2 shows a cross-sectional perspective view of the forming apparatus 101 (e.g., supply vessel 140) along line 2-2 of FIG. 1. In some embodiments, the supply vessel 140 can comprise a trough 201 oriented to receive the molten material 121 from the inlet conduit 141. For illustrative purposes, cross-hatching of the molten material 121 is removed from FIG. 2 for clarity. The supply vessel 140 can further comprise the forming wedge 209 comprising a pair of downwardly inclined converging surface portions 207, 208 extending between opposed ends 210, 211 (See FIG. 1) of the forming wedge 209. The pair of downwardly inclined converging surface portions 207, 208 of the forming wedge 209 can converge along the draw direction 154 to intersect along the root 145 of the supply vessel 140. A draw plane 213 of the glass manufacturing apparatus 100 can extend through the root 145 along the draw direction 154. In some embodiments, the ribbon 103 can be drawn in the draw direction 154 along the draw plane 213. As shown, the draw plane 213 can bisect the forming wedge 209 through the root 145 although, in some embodiments, the draw plane 213 can extend at other orientations relative to the root 145.

Additionally, in some embodiments, the molten material 121 can flow in a direction 156 into and along the trough 201 of the supply vessel 140. The molten material 121 can then overflow from the trough 201 by simultaneously flowing over corresponding weirs 203, 204 and downward over the outer surfaces 205, 206 of the corresponding weirs 203, 204. Respective streams of molten material 121 can then flow along the downwardly inclined converging surface portions 207, 208 of the forming wedge 209 to be drawn off the root 145 of the supply vessel 140, where the flows converge and fuse into the ribbon 103. The ribbon 103 of molten material can then be drawn off the root 145 in the draw plane 213 along the draw direction 154. In some embodiments, the ribbon 103 comprises one or more states of material based on a vertical location of the ribbon 103. For example, at one location, the ribbon 103 can comprise the viscous molten material 121, such that the ribbon 103 comprises a viscous ribbon, and at another location, the ribbon 103 can comprise an amorphous solid in a glassy state (e.g., a glass ribbon).

The ribbon 103 comprises a first major surface 215 and a second major surface 216 facing opposite directions and defining a thickness "T" (e.g., average thickness) of the ribbon 103. In some embodiments, the thickness "T" of the ribbon 103 can be less than or equal to about 2 millimeters (mm), less than or equal to about 1 millimeter, less than or equal to about 0.5 millimeters, for example, less than or equal to about 300 micrometers (μm), less than or equal to about 200 micrometers, or less than or equal to about 100 micrometers, although other thicknesses may be provided in further embodiments. For example, in some embodiments, the thickness "T" of the ribbon 103 can be from about 50 μm to about 750 μm, from about 100 μm to about 700 μm, from about 200 μm to about 600 μm, from about 300 μm to about 500 μm, from about 50 μm to about 500 μm, from about 50 μm to about 700 μm, from about 50 μm to about 600 μm, from about 50 μm to about 500 μm, from about 50 μm to about 400 μm, from about 50 μm to about 300 μm, from about 50 μm to about 200 μm, from about 50 μm to about 100 μm, including all ranges and subranges of thicknesses therebetween. In addition, the ribbon 103 can include a variety of compositions including, but not limited to, soda-lime glass, borosilicate glass, alumino-borosilicate glass, alkali-containing glass, or alkali-free glass.

In some embodiments, the glass separator 149 (see FIG. 1) can then separate a separated glass ribbon 104 from the ribbon 103 along the separation path 151 as the ribbon 103 is formed by the supply vessel 140. As illustrated, in some embodiments, the separation path 151 can extend along the width "W" of the ribbon 103 between the first outer edge 153 and the second outer edge 155. Additionally, in some embodiments, the separation path 151 can extend perpendicular to the draw direction 154 of the ribbon 103. Moreover, in some embodiments, the draw direction 154 can define a direction along which the ribbon 103 can be drawn from the supply vessel 140.

The separated glass ribbon can then be processed into a desired application, e.g., a display application. For example, the separated glass ribbon can be used in a wide range of display applications, including liquid crystal displays (LCDs), electrophoretic displays (EPD), organic light emitting diode displays (OLEDs), plasma display panels (PDPs), and other electronic displays.

Figure 3:
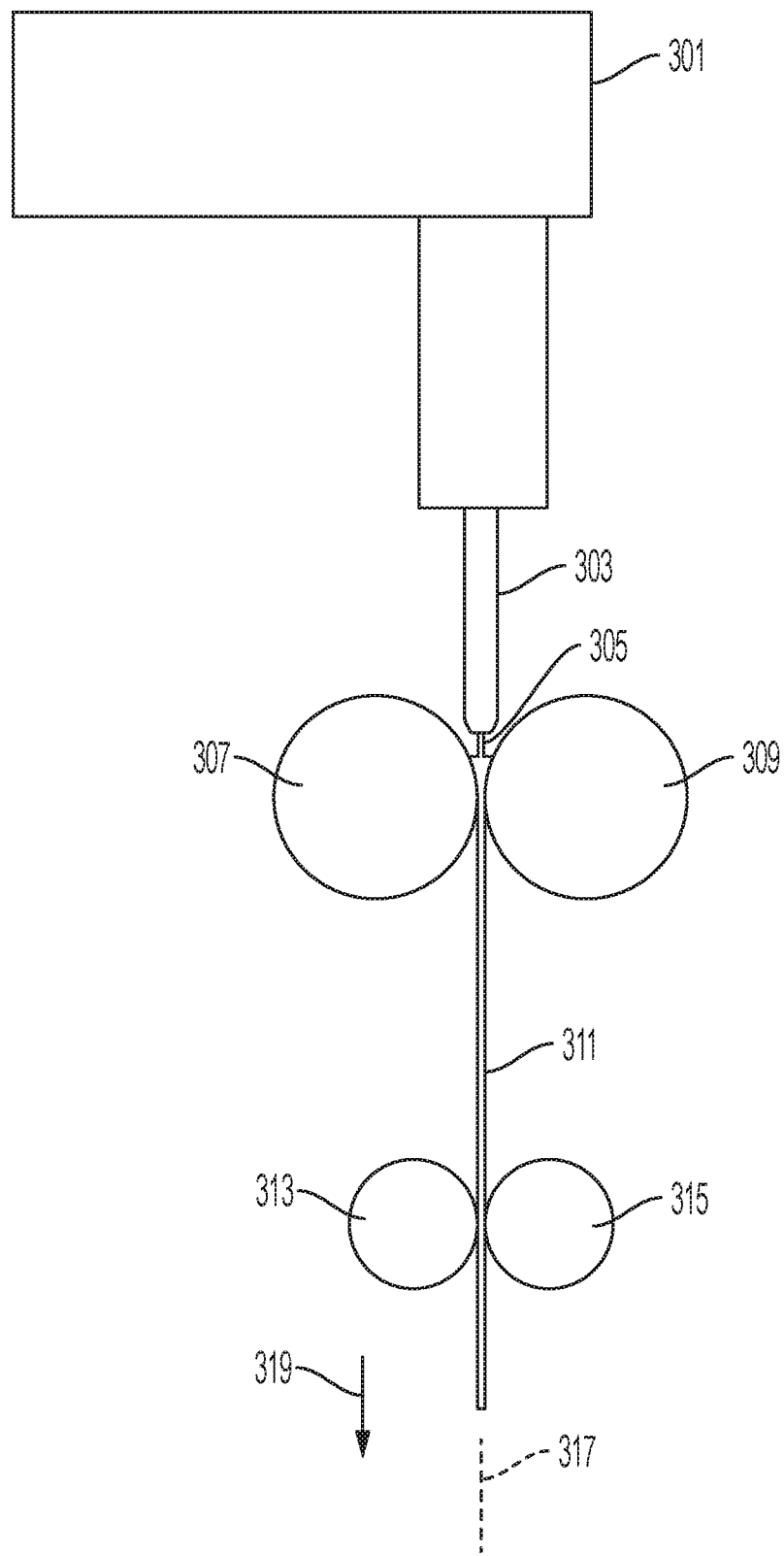
FIG. 3 illustrates a schematic end view of example embodiments of a ribbon source in accordance with embodiments of the disclosure.

Referring to FIG. 3, it will be appreciated that the ribbon may be provided by one or more types of sources. FIG. 3 illustrates a source of the ribbon, though, other sources may be provided in further embodiments. For example, in some embodiments, one source may comprise the supply vessel 140 illustrated and described relative to FIGS. 1-2. The supply vessel 140 may comprise the forming wedge 209 comprising the downwardly inclined converging surface portions 207, 208 and the root 145. The molten material 121 can be supplied from the supply vessel 140, whereupon the molten material 121 can be formed into the ribbon 103, with the ribbon 103 traveling along a travel path.

In some embodiments, another source of the ribbon may comprise a supply vessel 301 with a slot to slot draw the ribbon. For example, the supply vessel 301 may be hollow and can contain molten material. In some embodiments, an outlet tube 303 can be coupled to the supply vessel 301 and may define a passageway through which molten material 305 can exit the supply vessel 301. For example, the molten material 305 can flow from the supply vessel 301 and through the outlet tube 303, wherein the outlet tube 303 can comprise a slot (e.g., an opening, a hole, etc.) through which the molten material 305 can exit the outlet tube 303. In some embodiments, the outlet tube 303 can be oriented along a direction of gravity, such that the molten material 305 can flow downwardly along the direction of gravity through the outlet tube 303. The outlet tube 303 can be positioned above a pair of forming rolls 307, 309. The forming rolls 307, 309 can be spaced apart from each other to form a gap between the forming rolls 307, 309. In some embodiments, the forming rolls 307, 309 can rotate counter to each other. For example, in the orientation shown in FIG. 3, one forming roll 307 can rotate in a clockwise direction while the other forming roll 309 can rotate in a counter-clockwise direction.

In some embodiments, the molten material 305 may be delivered from the outlet tube 303 to a location between the forming rolls 307, 309. The molten material 305 can accumulate between the forming rolls 307, 309, whereupon the forming rolls 307, 309 can rotate to flatten, thin, and smooth the stream of molten material 305 into a ribbon 311. In this way, the forming rolls 307, 309 can direct the molten material 305 from the outlet tube 303 and through the gap. The ribbon 311 can exit the forming rolls 307, 309 and may be delivered to a pair of pulling rolls 313, 315. The pulling rolls 313, 315 can pull downwardly on the ribbon 311 and, in some embodiments, can generate a tension in the ribbon 311 to stabilize and/or stretch the ribbon 311. In some embodiments, the pulling rolls 313, 315 can rotate counter to each other. For example, in the orientation shown in FIG. 3, one pulling roll 313 can rotate in a clockwise direction while the other pulling roll 315 can rotate in a counter-clockwise direction. In some embodiments, the ribbon 311 can move along a travel path 317 in a travel direction 319.

In some embodiments, the ribbon 311 can comprise one or more states of material based on the vertical location of the ribbon 311. For example, at one location (e.g., directly below the forming rolls 307, 309), the ribbon 311 can comprise the viscous molten material 305, such that the ribbon 311 comprises a viscous ribbon. At another location (e.g., directly above the pulling rolls 313, 315), the ribbon 311 can comprise an amorphous solid in a glassy state.

Figure 4:
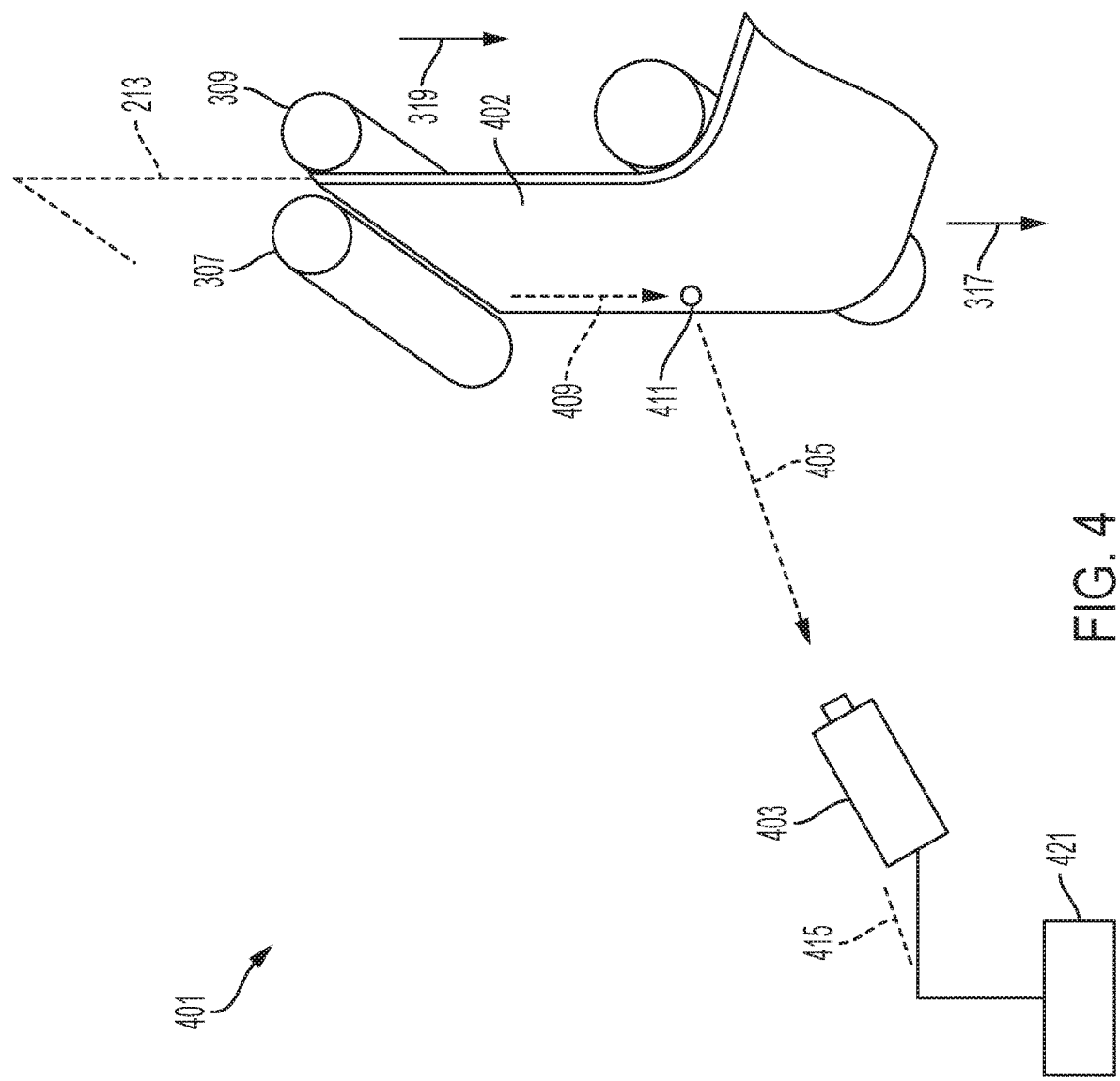
FIG. 4 is a perspective view of example embodiments of a processing apparatus in accordance with embodiments of the disclosure.

Referring to FIG. 4, a processing apparatus 401 for processing a viscous ribbon 402 is illustrated. In some embodiments, the viscous ribbon 402 can comprise the ribbon 103 (e.g., illustrated in FIGS. 1-2) at a vertical location where the ribbon 103 comprises the viscous molten material 121 and is in a viscous state. Likewise, in some embodiments, the viscous ribbon 402 can comprise the ribbon 311 (e.g., illustrated in FIG. 3) at a vertical location where the ribbon 311 comprises the viscous molten material 305 and is in a viscous state. Due to relatively high temperature of the viscous ribbon 402, the viscous ribbon 402 can generate and emit thermal light energy 405. For example, a portion of the viscous ribbon 402 can be imaged by a camera 403, wherein the portion of the viscous ribbon 402 that is imaged may comprise a temperature from about 1000° C. to about 1500° C. and may comprise a viscosity from about 1500 poise to about 2500 poise. In addition or in the alternative, in some embodiments, a portion of the emitted thermal light energy 405 can comprise thermal light energy 409 that may be generated from the supply vessel 140, 301 (e.g., illustrated in FIGS. 1-3) and/or from the molten material 121, 305. For example, the supply vessel 140, 301 may comprise a temperature from about 500° C. to about 2000° C. while the molten material 121, 305 exiting the supply vessel 140, 301 may comprise a temperature from about 1000° C. to about 2000° C. Thermal light energy 409 can be emitted from the supply vessel 140, 301 and/or from the molten material 121, 305 and can propagate along the viscous ribbon 402 from the supply vessel 140, 301, with the viscous ribbon 402 acting as a light guide. In some embodiments, the thermal light energy 409 propagating along the viscous ribbon 402 can impinge upon a defect 411 in the viscous ribbon 402, whereupon the thermal light energy 409 can propagate outwardly from the viscous ribbon 402 and may be received by the camera 403. In some embodiments, the emitted thermal light energy 405 can comprise one or more of the thermal light energy generated from the viscous ribbon 402 at the imaging location or the thermal light energy 409 that may be emitted from one or more of the supply vessel 140, 301 or the molten material 121, 305 that impinges upon the defect 411 in the viscous ribbon 402.

In some embodiments, the processing apparatus 401 can comprise the camera 403 that may be positioned downstream from the supply vessel 140, 301. For example, the camera 403 can be positioned to image a portion of the viscous ribbon 402 that may be downstream from the supply vessel 140, 301. In some embodiments, to image the viscous ribbon 402, the camera 403 can receive thermal light energy 405 from the viscous ribbon 402 and generate an image of a portion of the viscous ribbon 402 based on the received thermal light energy 405. The camera 403 can comprise, for example, an infrared camera that is configured to detect infrared light and generate an image based on the detected infrared light. In some embodiments, based on the image generated by the camera 403, the processing apparatus 401 can detect a defect that may be present in the viscous ribbon 402.

In some embodiments, the camera 403 may be oriented in a direction that may be non-orthogonal to a plane (e.g., draw plane 213) defined by the viscous ribbon 402 traveling along the travel path 317. For example, in some embodiments, the camera 403 may be positioned below the viscous ribbon 402. By being positioned below the viscous ribbon 402, the camera 403 may be positioned below a plane that may be orthogonal to the plane defined by the viscous ribbon 402. Such a position may be beneficial, for example, due to the camera 403 being exposed to a lower temperature when the camera is farther away from the supply vessel 140, 301. In some embodiments, the camera 403 can receive the thermal light energy 405 along an axis 415 that may intersect the viscous ribbon 402. In some embodiments, the axis 415 may form a non-orthogonal angle (e.g., an angle that may be greater than or less than 90 degrees) relative to the viscous ribbon 402. However, such a position of the camera 403 is not intended to be limiting, and in some embodiments, the camera 403 can be positioned such that the axis 415 may be substantially orthogonal relative to the viscous ribbon 402. In some embodiments, the camera 403 may comprise a high-resolution area scan camera that can record images of the viscous ribbon 402 at a rate of from about 2 frames per second to about 10 frames per second. In some embodiments, the camera 403 can generate images of the viscous ribbon 402, with an image resolution of from about 8 megapixels to about 10 megapixels, or about 9 megapixels. In some embodiments, to reduce the likelihood of the camera 403 incurring damage due to the temperature to which the camera 403 is exposed, the camera 403 may be housed within a cooled jacket, such as a water-cooled jacket, a gas-cooled jacket, etc. The cooled jacket can reduce the likelihood of overheating of the camera 403 and limit damage to components of the camera 403.

In some embodiments, the camera 403 can be coupled to a controller 421. The controller 421 may comprise, for example, a multi-variable controller that can receive imaging data related to the thermal light energy 405 from the camera 403. The controller 421 can comprise image processing software for evaluating generated images of the ribbon 402 and detecting defects within the ribbon 402 based on the generated image. In some embodiments, the controller 421 can comprise a programmable logic controller that can determine one or more characteristics of the viscous ribbon 402, such as a velocity of the viscous ribbon 402 moving along the travel direction 319, size of the viscous ribbon 402, defects within the viscous ribbon 402, a position of any defects within the viscous ribbon 402, size of the defects, etc. In some embodiments, the controller 421 comprises a memory for storing information related to the viscous ribbon 402, such as frequency of defects over a given time period, types of defects (e.g., inclusions, faultlines, etc.), etc. In some embodiments, the controller 421 can be coupled to a display, such that the information related to the viscous ribbon 402 can be displayed and may be viewable by a user.

Figure 5:
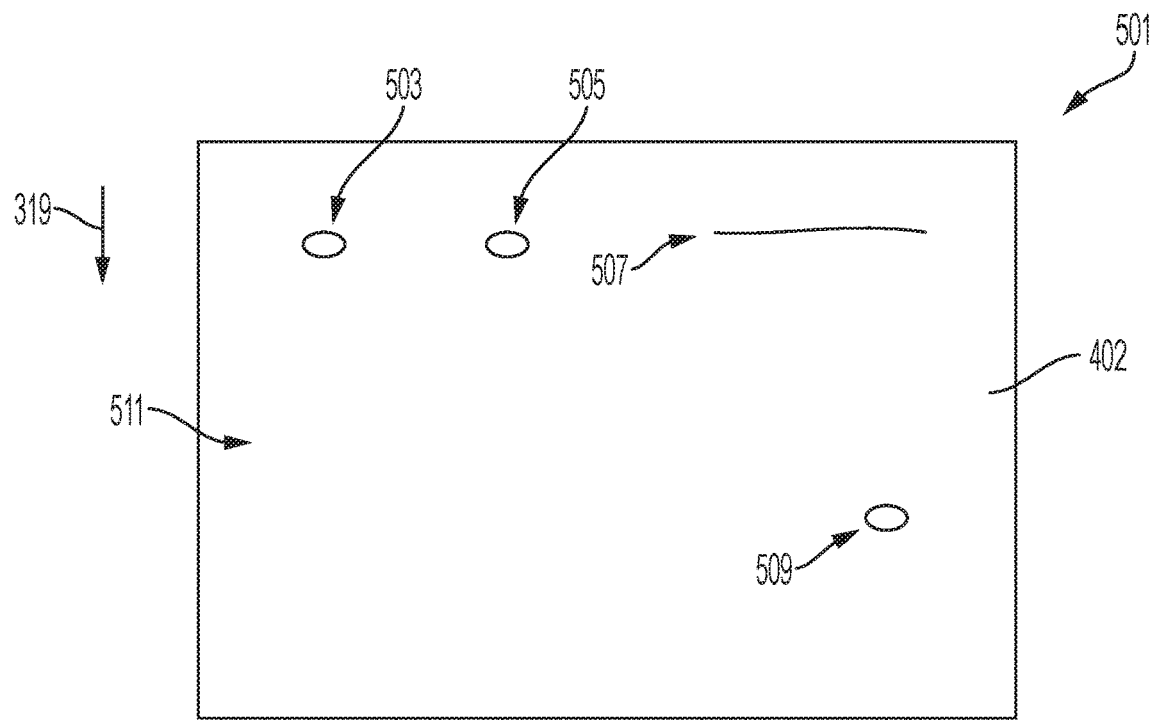
FIG. 5 is a front view of example embodiments of an image of a portion of a viscous ribbon generated by a camera in accordance with embodiments of the disclosure.

Referring to FIG. 5, an image 501 of the viscous ribbon 402 can be generated by the camera 403. In some embodiments, the camera 403 can initially receive the thermal light energy from the viscous ribbon 402. The thermal light energy emitted from the viscous ribbon 402 may be at a higher intensity or brightness than thermal light energy from the surrounding environment. As such, the area of the image 501 corresponding to a higher intensity or brightness may be indicative of the viscous ribbon 402, while adjacent areas that are at a lower intensity or brightness may be indicative of the surrounding environment. In some embodiments (e.g., as illustrated in FIG. 4), when the camera 403 is oriented at a direction that is non-orthogonal to the plane defined by the viscous ribbon 402, an initial image of the viscous ribbon 402 may be from a perspective that may be non-orthogonal to the plane defined by the viscous ribbon 402, wherein the axis 415 forms a non-orthogonal angle relative to the viscous ribbon 402. In some embodiments, it may be beneficial to rectify the initial image from the perspective that is non-orthogonal to the plane to a perspective that is orthogonal to the plane. These benefits may comprise, for example, ease with which dimensions of the viscous ribbon 402 can be obtained, such as a dimension of the viscous ribbon 402, a dimension of any defects within the viscous ribbon 402, a location of any defects relative to an edge of the viscous ribbon 402, etc. As such, methods of processing the viscous ribbon 402 can comprise rectifying the image 501 to a perspective that may be orthogonal to the plane defined by the viscous ribbon 402 traveling along the travel path 317.

In some embodiments, to rectify the image 501 to a perspective that is orthogonal to the plane defined by the viscous ribbon 402, a calibration target may initially be positioned in place of the viscous ribbon 402 prior to the viscous ribbon 402 being formed (e.g., such as when the source is not in operation, for example), or the calibration target may initially be positioned in front of the viscous ribbon 402 between the camera 403 and the viscous ribbon 402. The calibration target can have known dimensions (e.g., length and width) and may be positioned at a known distance and angle from the camera 403. The camera 403 can generate an initial image of the calibration target from the perspective that may be non-orthogonal to a plane defined by the calibration target. Based on the known dimensions of the calibration target and the known distance and angle between the calibration target and the camera 403, the initial image of the calibration target can be rectified to the perspective that may be orthogonal to the plane defined by the calibration target. The rectification of the initial image of the calibration target may comprise rotation and scaling of the initial image. In this way, the degree to which the initial image may be rotated from the non-orthogonal perspective to the orthogonal perspective and a proper scaling of the image can be determined. This degree of rotation and scaling can thereafter be applied to the initial image of the viscous ribbon 402 that may be generated from the camera 403, such that the image of the viscous ribbon 402 can be rectified to the perspective that may be orthogonal to the plane (e.g., as illustrated in FIG. 5).

After rectifying the image, methods of processing the viscous ribbon 402 can comprise identifying one or more areas of interest 503, 505, 507, 509 in the image 501. For example, the image 501 may be generated based on the thermal light energy 405 received from the viscous ribbon 402. In some embodiments, the thermal light energy 405 received from a portion 511 of the viscous ribbon 402 that does not comprise the area of interest 503 may be at a first intensity. The thermal light energy 405 received from the area of interest 503, 505, 507, 509 may be at a second intensity that may be greater than the first intensity. In some embodiments, the disparity between the first intensity and the second intensity may be due, in part, to thermal light energy 405 impinging upon and/or reflecting from the area of interest 503, 505, 507, 509. As such, the thermal light energy 405 that has impinged upon and/or reflected from the area of interest 503, 505, 507, 509 may be at a higher intensity (e.g., the second intensity) than the thermal light energy 405 received from other portions (e.g., the portion 511) of the viscous ribbon 402 that may not comprise areas of interest. In some embodiments, the area of interest 503, 505, 507, 509 may be represented within the image 501 as a brighter area or region while the other portions (e.g., portion 511) of the viscous ribbon 402 that do not comprise an area of interest may be represented as a less bright area or region. In some embodiments, identifying one or more areas of interest 503, 505, 507, 509 in the image 501 can comprise recognizing areas within the image 501 that area at a higher intensity than surrounding areas, which are at a lower intensity, and then classifying these higher intensity areas as the area(s) of interest 503, 505, 507, 509.

In some embodiments, the viscous ribbon 402 can comprise a plurality of areas of interest, such as a first area of interest 503, a second area of interest 505, a third area of interest 507, and a fourth area of interest 509. In some embodiments, the area of interest 503, 505, 507, 509, may comprise a defect within the viscous ribbon 402, such as an inclusion or a surface characteristic. An inclusion may occur when gas or an unwanted material is present within the viscous ribbon 402. A surface characteristic may comprise, for example, a scratch on one or more of the first major surface or the second major surface of the viscous ribbon 402, a crack within the viscous ribbon 402, other types of fault lines on or within the viscous ribbon 402, etc. The area of interest 503, 505, 507, 509 may not be limited to comprising a defect, however, and in some embodiments, the area of interest 503, 505, 507, 509 may comprise an artifact, which may be representative of a false-positive in the image 501. An artifact differs from a defect in that an artifact may not be representative of an imperfection of the viscous ribbon 402 and, as such, may not be an inclusion, fault-line, crack, scratch, etc. Rather, an artifact represents a false-positive within the image 501, such as by appearing to potentially be a defect, while not actually being a defect. An artifact may comprise, for example, a reflection of hardware equipment near the camera 403, a particle (e.g., dust, moisture, etc.) in the air or on a lens of the camera 403, aberrations in the imaging process, etc.

Figure 6:
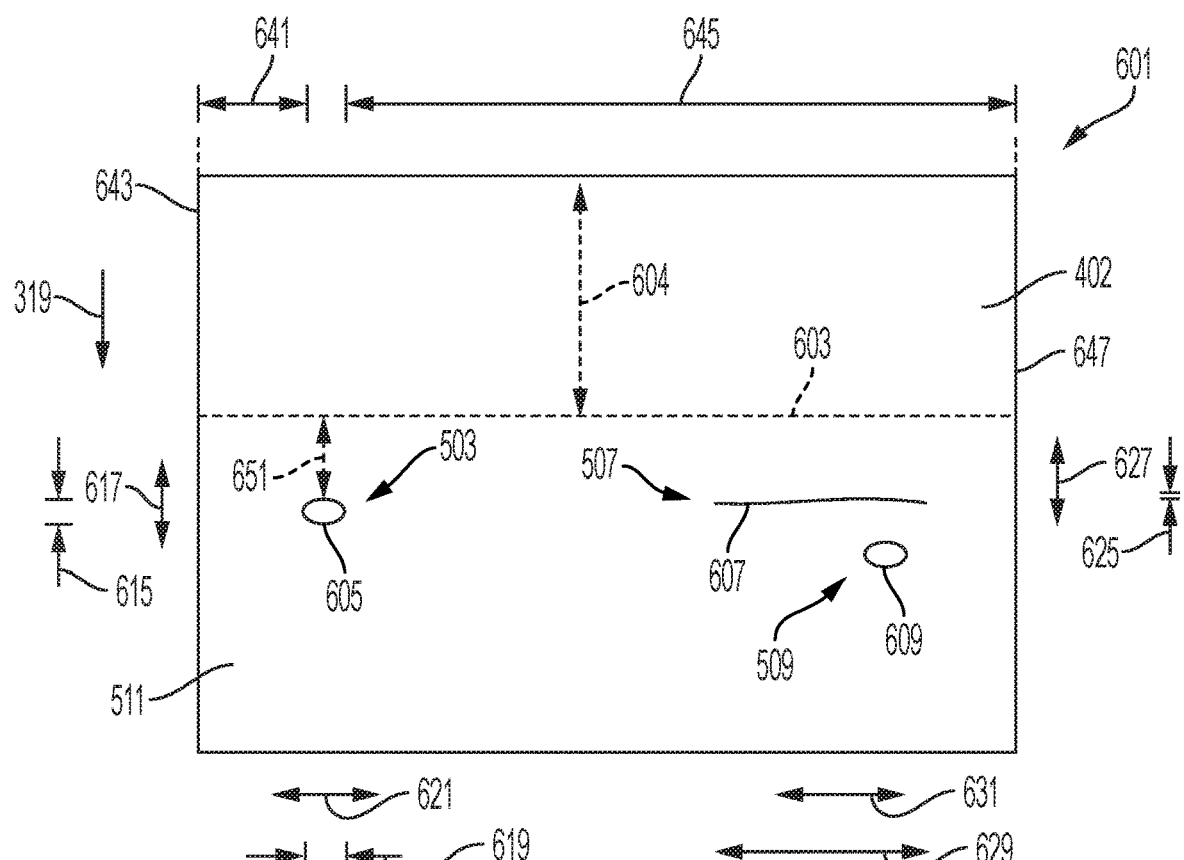
FIG. 6 is a front view of example embodiments of a second image of the portion of the viscous ribbon generated by the camera in accordance with embodiments of the disclosure.

Referring to FIG. 6, a second image 601 of the viscous ribbon 402 can be generated, wherein the second image 601 may be representative of the viscous ribbon 402 after a period of time has passed from when the image 501 of the viscous ribbon 402 in FIG. 5 was generated by the camera 403. For example, the viscous ribbon 402 can move in the travel direction 319, which may be downward in some embodiments. An upper boundary 603 (e.g., illustrated with a dashed line in FIG. 6) may be representative of an upper boundary of the image 501 in FIG. 5, wherein the upper boundary 603 has moved downwardly as the viscous ribbon 402 moves along the travel direction 319. As illustrated in FIG. 6, the upper boundary 603 and some of the areas of interest (e.g., the first area of interest 503 and the third area of interest 507) have moved a first distance 604 downwardly along the travel direction 319 relative to FIG. 5 as the viscous ribbon 402 moves along the travel direction 319. In some embodiments, the second image 601 can represent a consecutive image of the viscous ribbon 402 after the image 501. For example, by representing a consecutive image, no intervening images of the viscous ribbon 402 between the image 501 and the second image 601 may have been generated, such that following the generated image 501 of the viscous ribbon 402, the next generated image of the viscous ribbon 402 may comprise the second image 601. In other embodiments, however, the second image 601 may not represent a consecutive image, such that one or more intervening images of the viscous ribbon 402 may be generated between the image 501 and the second image 601.

In some embodiments, once the area of interest 503, 505, 507, 509 has been identified, methods of processing the viscous ribbon 402 can comprise determining if the area of interest comprises a defect 605, 607 of the viscous ribbon 402. For example, the determining if the area of interest 503, 505, 507, 509 comprises the defect 605, 607 can comprise measuring a first velocity of the viscous ribbon 402 and a second velocity of the area of interest 503, 505, 507, 509. In some embodiments, the first velocity of the viscous ribbon 402 may already be known, while in other embodiments, the first velocity of the viscous ribbon 402 can be measured (e.g., such as by measuring the distance that the upper boundary 603 has moved from the image 501 to the second image 601). For example, measuring the first velocity of the viscous ribbon 402 can comprise determining the first distance 604 that the viscous ribbon 402 has moved between a first position (e.g., illustrated in FIG. 5) and a second position (e.g., illustrated in FIG. 6). The first distance 604 can then be divided by a period of time, such as, for example, the amount of time that has elapsed between when the viscous ribbon 402 is in the first position and the second position. The result of dividing the first distance 604 by the amount of time that has elapsed can yield the first velocity of the viscous ribbon 402.

In some embodiments, measuring the second velocity of the area of interest 503, 505, 507, 509 can comprise dividing a second distance that the area of interest 503, 505, 507, 509 has moved between the first position (e.g., illustrated in FIG. 5) and the second position (e.g., illustrated in FIG. 6) over the period of time. For example, the first area of interest 503 can travel a first distance between the image 501 and the second image 601. Likewise, the second area of interest 505 can travel a second distance between the image 501 and the second image 601. The third area of interest 507 can travel a third distance between the image 501 and the second image 601. The fourth area of interest 509 can travel a fourth distance between the image 501 and the second image 601. These distances (e.g., the first distance of the first area of interest 503, the second distance of the second area of interest 505, the third distance of the third area of interest 507, and the fourth distance of the fourth area of interest 509) can be divided by the amount of time that has elapsed between when the viscous ribbon 402 is in the first position (e.g., illustrated in FIG. 5) and the second position (e.g., illustrated in FIG. 6) to obtain a second velocity of each of the first area of interest 503, the second area of interest 505, the third area of interest 507, and the fourth area of interest 509. If the first velocity (e.g., of the viscous ribbon 402) is substantially equal to the second velocity (e.g., of the first area of interest 503 and the third area of interest 507), then the area of interest 503 may be classified as comprising the defect 605, 607. For example, the viscous ribbon 402 can move at the first velocity along the travel path 317 in the travel direction 319. If the viscous ribbon 402 comprises a defect, then the defect may likewise move with the viscous ribbon 402 along the travel path 317 in the travel direction 319. In some embodiments, if the viscous ribbon 402 and the area of interest 503 are moving at substantially the same velocity (e.g., wherein the first velocity is substantially equal to the second velocity), then it may be likely that the area of interest 503 comprises a defect.

In some embodiments, the area of interest (e.g., the second area of interest 505 and the fourth area of interest 509) may not comprise a defect of the viscous ribbon 402, but, rather, the area of interest (e.g., the second area of interest 505 and the fourth area of interest 509) may comprise an artifact 609. In some embodiments, to differentiate between a defect and an artifact, after measuring the first velocity of the of the viscous ribbon 402 and the second velocity of the area of interest 503, 505, 507, 509, the first velocity and the second velocity can be compared. For example, if the second velocity is less than the first velocity, then the area of interest 503, 505, 507, 509 may not comprise a defect. Rather, in some embodiments, if the second velocity is close to zero such that the area of interest 503, 505, 507, 509 does not move with the viscous ribbon 402 along the travel path 317 in the travel direction 319, then the area of interest 503, 505, 507, 509 may be classified as an artifact. For example, the fourth area of interest 509 has not moved with the viscous ribbon 402 when comparing the image 501 and the second image 601, such that a distance traveled by the fourth area of interest 509 may be zero. Therefore, the second velocity of the fourth area of interest 509 may likewise be zero. In some embodiments, due to the fourth area of interest 509 comprising the second velocity (e.g., zero) that may be less than the first velocity, then the fourth area of interest 509 can comprise an artifact 609. In contrast, the first area of interest 503 and the second area of interest 507 are illustrated as having moved between the first image 501 and the second image 601, such that the second velocity of the first area of interest 503 and the second area of interest 507 may be greater than zero.

In some embodiments, if the area of interest (e.g., the second area of interest 505) is present in the image 501, but subsequently disappears and/or is not present in the following images, then the area of interest (e.g., the second area of interest 505) may comprise an artifact. For example, the determining if the area of interest comprises the defect can comprise identifying the area of interest 503, 505, 507, 509 in consecutive images of the viscous ribbon 402. For example, the second area of interest 505 may be present in the image 501 of FIG. 5, but the second area of interest 505 may not be present in the second image 601 of FIG. 6. Due to the second area of interest 505 not appearing in a subsequent, consecutive image of the viscous ribbon 402 (e.g., in the second image 601), then the second area of interest 505 may be classified as an artifact. As such, in some embodiments, if the area of interest is in consecutive images of the viscous ribbon 402, then the area of interest may be classified as comprising a defect provided that the second velocity of the area of interest may be substantially equal to the first velocity of the viscous ribbon 402. However, if the area of interest 503, 505, 507, 509 does not appear in consecutive images of the viscous ribbon 402, then the area of interest (e.g., the second area of interest 505) may not be classified as a defect, but, rather, may be classified as an artifact.

In some embodiments, after an area of interest has been determined to comprise a defect, the detecting the defect of the viscous ribbon 402 can comprise determining if the defect comprises an inclusion within the viscous ribbon 402 or a surface characteristic at a major surface of the viscous ribbon 402. In some embodiments, different types of defects can be found within the viscous ribbon 402, for example, inclusions or surface characteristics. An inclusion may comprise gas or an unwanted material that may be present within the viscous ribbon 402. In some embodiments, an inclusion may comprise a bubble formed within the viscous ribbon 402. In some embodiments, a surface characteristic may comprise a scratch on the major surface of the viscous ribbon, a crack within the viscous ribbon 402, other types of fault lines on or within the viscous ribbon 402, etc.

Determining whether the first defect 605 comprises an inclusion or a surface characteristic can comprise measuring the first defect 605 to obtain a first dimension 615 of the first defect 605 in a first direction 617 that may be parallel to the travel direction 319 of the viscous ribbon 402 and a second dimension 619 of the first defect 605 in a second direction 621 that may be orthogonal to the travel direction 319. In some embodiments, if the first dimension 615 and the second dimension 619 are less than a preset dimension, then the defect (e.g., the first defect 605) can be classified as comprising an inclusion. For example, in some embodiments, the preset dimension can be about 10 millimeters (mm). As such, if the first dimension 615 of the first defect 605 is less than about 10 mm, and if the second dimension 619 of the first defect 605 is less than about 10 mm, then the first defect 605 may comprise an inclusion. In some embodiments, the defect (e.g., the second defect 607) can comprise a surface characteristic. For example, determining whether the second defect 607 comprises an inclusion or a surface characteristic can comprise measuring the second defect 607 to obtain a first dimension 625 of the second defect 607 in a first direction 627 that may be parallel to the travel direction 319 of the viscous ribbon 402 and a second dimension 629 of the second defect 607 in a second direction 631 that may be orthogonal to the travel direction 319. In some embodiments, if the first dimension 625 or the second dimension 629 are greater than a preset dimension, then the defect (e.g., the second defect 607) can be classified as comprising a surface characteristic. For example, in some embodiments, the present dimension can be about 10 mm. As such, if the first dimension 625 of the second defect 607 is greater than about 10 mm, or if the second dimension 629 of the second defect 607 is greater than about 10 mm, then the second defect 607 comprises a surface characteristic. In some embodiments, if it is determined that a plurality of defects are in close proximity to each other, and if each of the plurality of defects is classified as comprising an inclusion, then the plurality of defects may be grouped together and collectively determined to be a surface characteristic at the major surface of the viscous ribbon 402. For example, when a grouping of inclusions is near each other, and the grouping comprises a first dimension or a second dimension that may be greater than the preset dimension, then it may be likely that the grouping comprises a fault-line or scratch at a major surface of the viscous ribbon 402, such that the grouping of inclusions may be determined to be a surface characteristic.

In some embodiments, the detecting the defect (e.g., the first defect 605 and/or the second defect 607) of the viscous ribbon 402 can comprise determining a position of the defect (e.g., the first defect 605 and/or the second defect 607) by measuring a distance from an edge of the viscous ribbon 402 to the defect (e.g., the first defect 605 and/or the second defect 607). For example, with reference to the first defect 605, a position of the first defect 605 can be determined by measuring a distance from one or more edges of the viscous ribbon 402 to the first defect 605. In some embodiments, a first separating distance 641 can be measured between the first defect 605 and a first edge 643 of the viscous ribbon 402, with the first separating distance 641 measured along a direction that may be orthogonal to the travel direction 319 of the viscous ribbon 402. The first separating distance 641 can comprise a minimum distance between the first defect 605 and the first edge 643. In some embodiments, a second separating distance 645 can be measured between the first defect 605 and a second edge 647 of the viscous ribbon 402, with the second separating distance 645 measured along a direction that may be orthogonal to the travel direction 319 of the viscous ribbon 402. The second separating distance 645 can comprise a minimum distance between the first defect 605 and the second edge 647.

In some embodiments, the position of the first defect 605 may not be limited to determining the first separating distance 641 from the first edge 643 and the second separating distance 645 from the second edge 647. Rather, in some embodiments, the determining the position of the defect can comprise determining a position of the first defect 605 along a direction that may be parallel to the travel direction 319 of the viscous ribbon 402. For example, in some embodiments, the upper boundary 603 can represent a separation path along which a portion of the viscous ribbon 402 can be separated by the glass separator 149 (e.g., scribe, score wheel, diamond tip, laser, etc.) at a downstream location from where the viscous ribbon 402 may be imaged by the camera 403. A third separating distance 651 can be measured between the first defect 605 and the upper boundary 603 of the viscous ribbon 402, with the third separating distance 651 measured along a direction that may be parallel to the travel direction 319 of the viscous ribbon 402. The third separating distance 651 can comprise a minimum distance between the first defect 605 and the upper boundary 603. In some embodiments, after measuring the first separating distance 641, the second separating distance 645, and the third separating distance 651, a position of the defect (e.g., the first defect 605) relative to the first edge 643, the second edge 647 and optionally the upper boundary 603 can be known.

Figure 7:
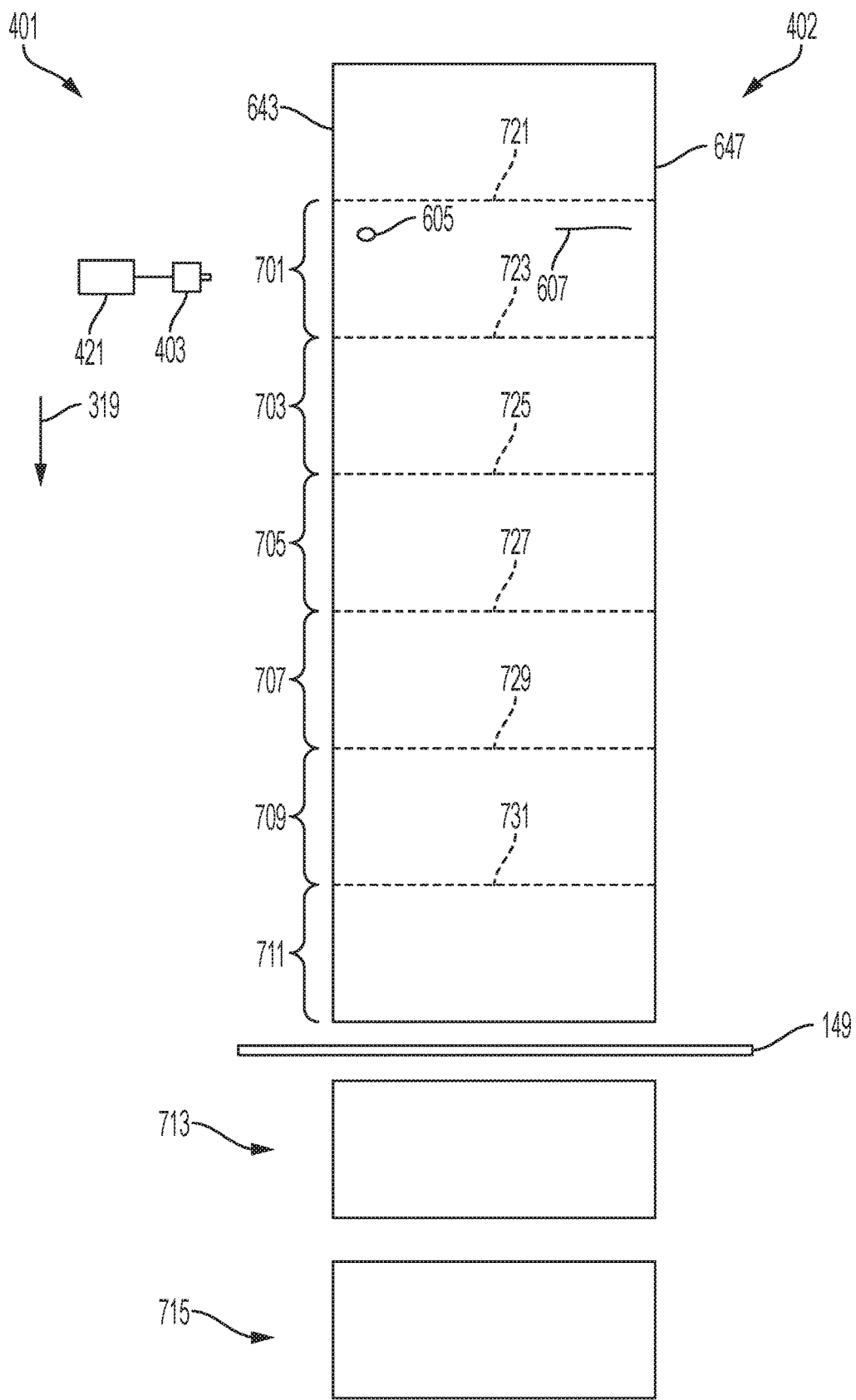
FIG. 7 is a front view of example embodiments of the viscous ribbon comprising a plurality of segments in accordance with embodiments of the disclosure.

Referring to FIG. 7, in some embodiments, the viscous ribbon 402 can comprise a plurality of segments. For example, the viscous ribbon 402 can comprise a first segment 701, a second segment 703, a third segment 705, a fourth segment 707, a fifth segment 709, a sixth segment 711, a seventh segment 713, and an eighth segment 715, although in further embodiments, the viscous ribbon 402 can comprise more or fewer than eight segments. In some embodiments, the segments 701, 703, 705, 707, 709, 711, 713, 715 can be separated from each other at a location downstream from where the viscous ribbon 402 may be imaged, such that the segments 701, 703, 705, 707, 709, 711, 713, 715 can each form a separated glass ribbon. In some embodiments, the seventh segment 713 and the eighth segment 715 are illustrated as having already been separated from the viscous ribbon 402 by the glass separator 149. In some embodiments, at a leading end of the viscous ribbon 402, the viscous ribbon 402 comprises a sixth separation path 731 along which the sixth segment 711 can be separated from the fifth segment 709 of the viscous ribbon 402 by the glass separator 149. In some embodiments, the viscous ribbon 402 comprises a fifth separation path 729 along which the fifth segment 709 can be separated from the fourth segment 707 of the viscous ribbon 402 by the glass separator 149. In some embodiments, the viscous ribbon 402 comprises a fourth separation path 727 along which the fourth segment 707 can be separated from the third segment 705 of the viscous ribbon 402 by the glass separator 149. In some embodiments, the viscous ribbon 402 comprises a third separation path 725 along which the third segment 705 can be separated from the second segment 703 of the viscous ribbon 402 by the glass separator 149. In some embodiments, the viscous ribbon 402 comprises a second separation path 723 along which the second segment 703 can be separated from the first segment 701 of the viscous ribbon 402 by the glass separator 149. In some embodiments, the viscous ribbon 402 comprises a first separation path 721 along which the first segment 701 can be separated from an upstream portion of the viscous ribbon 402 by the glass separator 149. It will be appreciated that, for illustrative purposes, the first segment 701 comprises the first defect 605 and the second defect 607, while the other segments 703, 705, 707, 709, 711, 713, 715 do not comprise defects. However, in other embodiments, one or more of the other segments 703, 705, 707, 709, 711, 713, 715 may comprise defects, while the first segment 701 may or may not comprise the first defect 605 and/or the second defect 607.

In some embodiments, methods of processing the viscous ribbon 402 can comprise tracking the first segment 701 of the viscous ribbon 402, which comprises the defect. In some embodiments, the tracking the first segment 701 can comprise measuring the first velocity of the viscous ribbon 402. For example, as described above, measuring the first velocity of the viscous ribbon 402 can comprise dividing a first distance that the viscous ribbon 402 has moved between a first position and a second position by a period of time, for example, the amount of time that has elapsed between when the viscous ribbon 402 is in the first position and the second position. In some embodiments, the first velocity of the viscous ribbon 402 may already be known, while in other embodiments, the first velocity can be measured. As described above, the positions of the first defect 605 and the second defect 607 within the first segment 701 may be known. For example, the separating distances of the first defect 605 and the second defect 607 from the first edge 643 and the second edge 647 may be known. Likewise, in some embodiments, the separating distances of the first defect 605 and the second defect 607 from the first separation path 721 may also be known. As such, due to measuring the first velocity of the first segment 701, the first segment 701 can be tracked from the camera 403 to a downstream location where the first segment 701 may be separated. Further, the positions of the first defect 605 and the second defect 607 within the first segment 701 relative to the first edge 643, the second edge 647, and the first separation path 721 may also be known. In some embodiments, a distance of the first defect 605 and/or the second defect 607 from the second separation path 723 may likewise be determined in a similar manner as the distance of the first defect 605 and/or the second defect 607 from the first separation path 721.

In some embodiments, methods of processing the viscous ribbon 402 can comprise categorizing the segments 701, 703, 705, 707, 709, 711, 713, 715 into defect-containing segments and defect-free segments. Defect-containing segments may comprise segments (e.g., the first segment 701) comprising one or more defects, such as the first defect 605, the second defect 607, etc., while defect-free segments may comprise segments (e.g., segments 703, 705, 707, 709, 711, 713, 715) that do not comprise defects. In some embodiments, the processing apparatus 401 can determine which of the segments 701, 703, 705, 707, 709, 711, 713, 715 contain defects, categorize the segments 701, 703, 705, 707, 709, 711, 713, 715 that contain defects as defect-containing segments, and track the defect-containing segments (e.g., the first segment 701). In some embodiments, the processing apparatus 401 can track the defect-containing segments (e.g., the first segment 701) from a location where the segment may be imaged by the camera 403 to a downstream location, such as after the defect-containing segment (e.g., the first segment 701) has been separated from the viscous ribbon 402. By categorizing and tracking the segments of the viscous ribbon 402, ease of removing the defect-containing segments may be improved. For example, an operator may know not only which of the segments 703, 705, 707, 709, 711, 713, 715 contain defects after the defect-containing segments have been separated from the viscous ribbon 402, but also the location of defects within the defect-containing segments.

Figure 8:
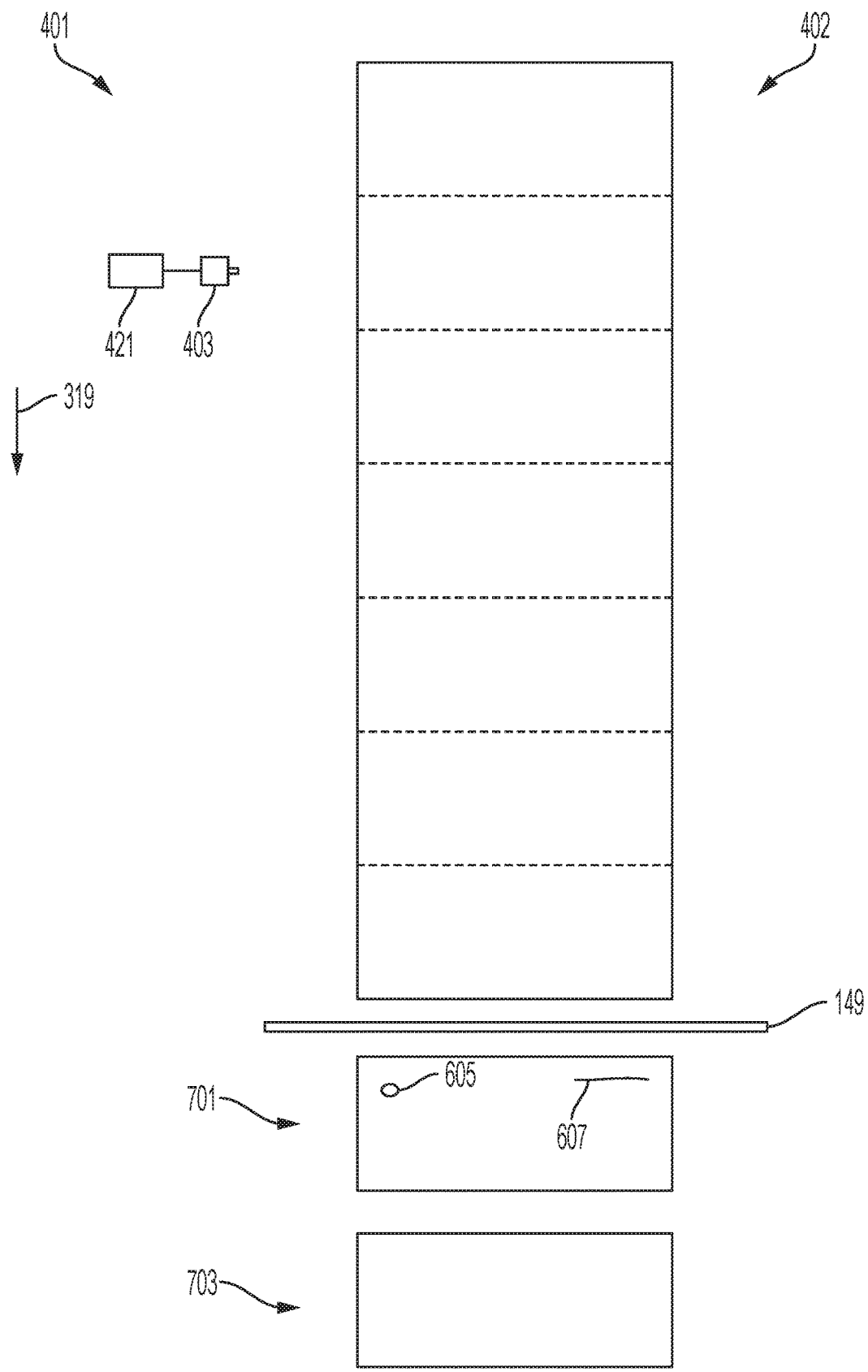
FIG. 8 is a front view of example embodiments of the viscous ribbon comprising a segment comprising a defect being separated from the viscous ribbon in accordance with embodiments of the disclosure.

Referring to FIG. 8, in some embodiments, as the viscous ribbon 402 moves in the travel direction 319, the segments can be separated from the ribbon with the glass separator 149. For example, the second segment 703 can be separated from the ribbon (e.g., at a downstream location of the viscous ribbon 402 wherein the ribbon is in a glassy state) with the glass separator 149 along the second separation path 723 (e.g., illustrated in FIG. 7). Likewise, after the second segment 703 has been separated, the first segment 701 can be separated from the ribbon (e.g., at a downstream location of the viscous ribbon 402 wherein the ribbon is in a glassy state) with the glass separator 149 along the first separation path 721 (e.g., illustrated in FIG. 7). In some embodiments, one or more of the segments 701, 703, 705, 707, 709, 711, 713, 715 can be stacked to form a stack of separated glass ribbon segments. Prior to or after the stacking of the segments, it may be beneficial to separate the defect-containing segments from the defect-free segments.

Figure 9:
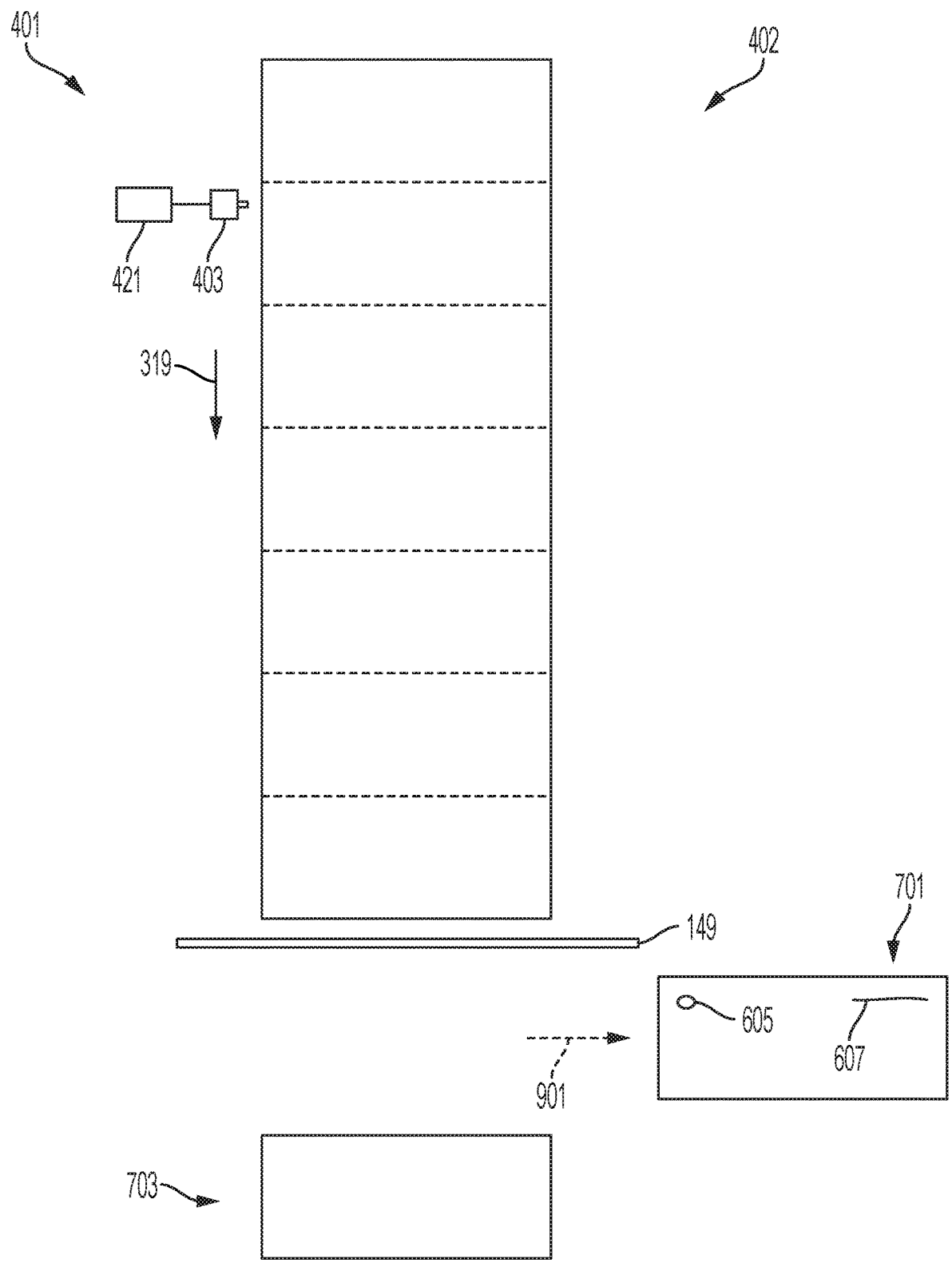
FIG. 9 is a front view of example embodiments of the segment comprising the defect being removed from the viscous ribbon in accordance with embodiments of the disclosure.

Referring to FIG. 9, in some embodiments, methods of processing the viscous ribbon 402 can comprise removing 901 the first segment 701 from the ribbon (e.g., at a downstream location of the viscous ribbon 402 wherein the ribbon is in a glassy state) downstream from a portion of the viscous ribbon 402 that is imaged. In some embodiments, due to the second segment 703, the third segment 705, the fourth segment 707, the fifth segment 709, the sixth segment 711, the seventh segment 713, and the eighth segment 715 not comprising, defects, these segments (e.g., the second segment 703, the third segment 705, the fourth segment 707, the fifth segment 709, the sixth segment 711, the seventh segment 713, and the eighth segment 715) may not be removed from the ribbon. For example, the processing apparatus 401 can track the segments 701, 703, 705, 707, 709, 711, 713, 715 of the viscous ribbon 402 after the segments 701, 703, 705, 707, 709, 711, 713, 715 have been separated from the viscous ribbon 402 by the glass separator 149. In some embodiments, to separate the defect-containing segments (e.g., the first segment 701) from the defect-free segments (e.g., the second segment 703), the first segment 701 can be removed 901 from the defect-free segments. Due to the prior determination of the location of the first defect 605 and the second defect 607 within the first segment 701, an operator can remove and inspect the first segment 701 to confirm that the first segment 701 not only comprises the first defect 605 and the second defect 607, but also that the first segment 701 comprises the first defect 605 and the second defect 607 in an expected location relative to edges of the first segment 701. The removing 901 of the first segment 701 can comprise segregating the first segment 701, which comprises defects, from the other segments 703, 705, 707, 709, 711, 713, 715 which do not comprise defects.

Figure 10:
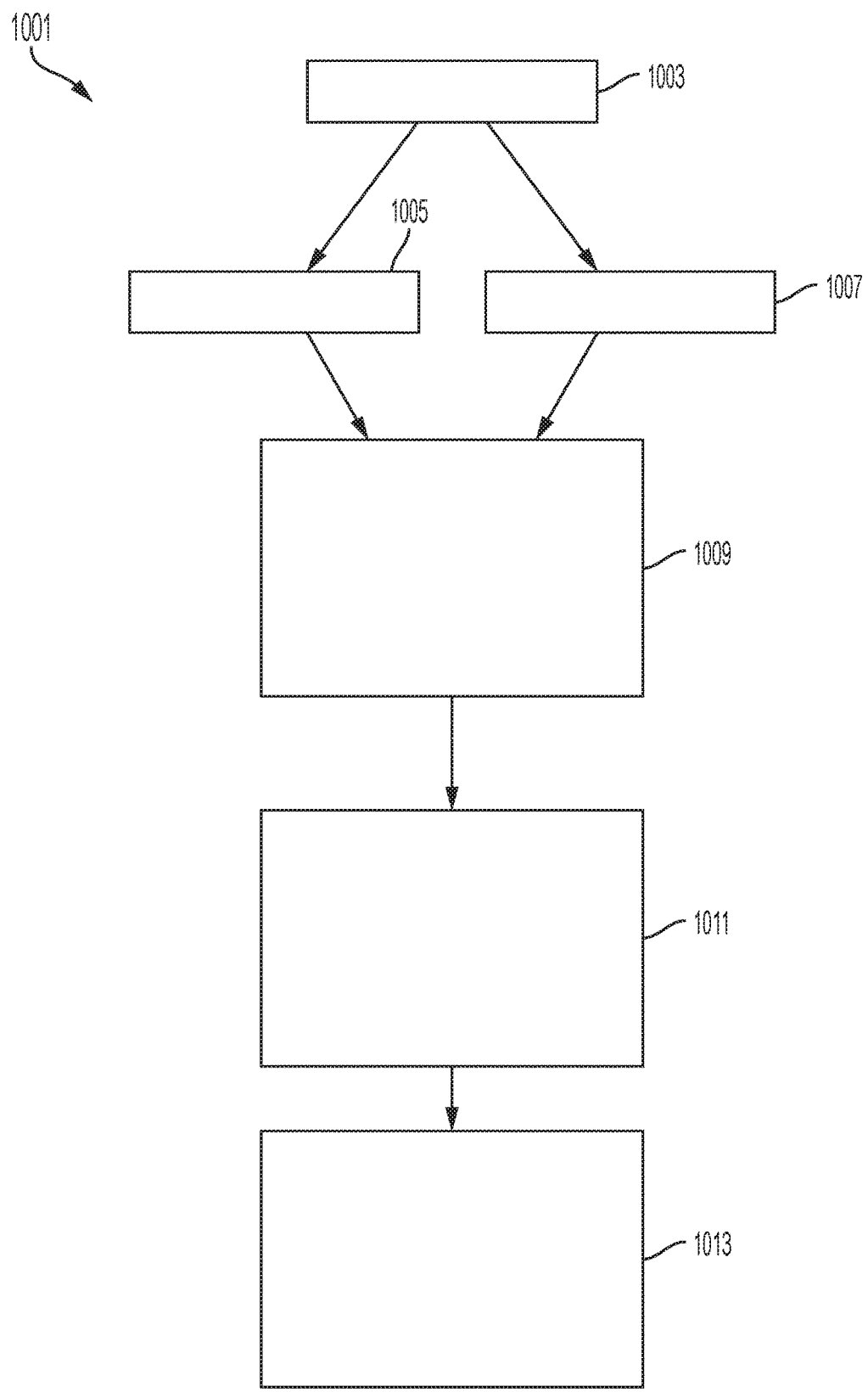
FIG. 10 schematically illustrates example embodiments of methods of processing a viscous ribbon in accordance with embodiments of the disclosure.

Referring to FIG. 10, a schematic flow diagram 1001 illustrating methods of processing the viscous ribbon 402 is illustrated. In some embodiments, methods of processing the viscous ribbon 402 can comprise receiving images of the viscous ribbon 402 from the camera 403 at an image acquisition node 1003. For example, the camera 403 can receive the thermal light energy 405 from the viscous ribbon 402 and generate an image (e.g., the image 501, the second image 601, etc.) of the viscous ribbon 402. In some embodiments, the camera 403 can generate images of the viscous ribbon 402 at a rate of from about 2 images per second to about 10 images per second. In some embodiments, the camera 403 can generate 3 or more images per defect in the viscous ribbon 402. By generating multiple images of each defect in the viscous ribbon 402, the processing apparatus 401 can confirm that the viscous ribbon 402 comprises the defect and not, for example, an artifact.

In some embodiments, methods of processing the viscous ribbon 402 can comprise receiving the images of the viscous ribbon 402 from the image acquisition node 1003 at a first image processing node 1005 and a second image processing node 1007. Image processing of the images can occur at the first image processing node 1005 and the second image processing node 1007. For example, by comprising a plurality of image processing nodes, the time to process a plurality of images may be reduced (e.g., as compared to embodiments with a single image processing node). The image acquisition node 1003 can send one image to the first image processing node 1005 for image processing. The image acquisition node 1003 can send the next consecutive image to the second image processing node 1007 for image processing. In this way, a backlog of images to be processed at one or more of the first image processing node 1005 or a second image processing node 1007 may be reduced.

In some embodiments, the first image processing node 1005 and the second image processing node 1007 can first rectify the images to the perspective that may be orthogonal to the plane defined by the viscous ribbon 402 traveling along the travel path. Following image rectification, the first image processing node 1005 and the second image processing node 1007 can identify one or more areas of interest within the image 501, 601, such as, for example, the first area of interest 503, the second area of interest 505, the third area of interest 507, and/or the fourth area of interest 509. The area of interest may be identified based on areas within the generated image 501, 601 that have a higher intensity (e.g., higher brightness) than surrounding areas of the image 501, 601. Next, the first image processing node 1005 and the second image processing node 1007 can determine if the area of interest 503, 505, 507, 509 comprises a defect (e.g., the first defect 605, the second defect 607, etc.) or an artifact (e.g., the artifact 609). Determination of whether the area of interest 503, 505, 507, 509 comprises the defect can comprise, for example, measurement and comparison of the first velocity of the viscous ribbon 402 and the second velocity of the area of interest 503, 505, 507, 509. In addition or in the alternative, in some embodiments, determination of whether the area of interest 503, 505, 507, 509 comprises the defect can comprise determining if the area of interest 503, 505, 507, 509 is in consecutive images of the viscous ribbon 402. The first image processing node 1005 and the second image processing node 1007 can then classify any found defects (e.g., the first defect 605, the second defect 607, etc.) as an inclusion or a surface characteristic based on whether measured dimensions of the defects are greater than a preset dimension. Information related to the defects may also be determined, for example, the position of the defects within the viscous ribbon 402 (e.g., the separating distance of the defect from edges and/or boundaries of the viscous ribbon 402, etc.), the size of the defects, etc.

In some embodiments, the images of the viscous ribbon 402 and the information related to any defects within the viscous ribbon 402 may be sent from the first image processing node 1005 and the second image processing node 1007 to an inspection results node 1009. At the inspection results node 1009, data related to the viscous ribbon 402 and/or the defects within the viscous ribbon 402 may be transmitted to a display, such as a monitor. In some embodiments, the data may comprise the velocity of the viscous ribbon 402, the size of the viscous ribbon 402, the presence and/or absence of defects within the viscous ribbon 402, types of defects, the size of the defects, the position of the defects within the viscous ribbon 402, etc. In some embodiments, the inspection results node 1009 can trigger an alarm if a defect has been detected by the first image processing node 1005 or the second image processing node 1007. In some embodiments, the defect information and the image of the viscous ribbon 402 may then be sent from the inspection results node 1009 to a tracking node 1011. Within the tracking node 1011, the defects can be further classified and tracked as the viscous ribbon 402 moves in the travel direction 319. Information related to the identified defects, the viscous ribbon 402, and the images of the viscous ribbon 402 may then be sent to a database 1013 for storage.

In some embodiments, the processing apparatus 401 can provide several benefits associated with detecting defects within the viscous ribbon 402. For example, the camera 403 can receive thermal light energy from the viscous ribbon 402 and generate an image of the viscous ribbon 402 based on the received thermal light energy. As such, due to the use of the thermal light energy, additional light sources may not be used. In addition, the processing apparatus 401 can separately classify defects within the viscous ribbon 402 from artifacts, and classify the types of defects that may be detected. For example, the images generated by the camera 403 can be processed to determine not only that a defect may be present within the viscous ribbon 402, but also whether the defect may be an inclusion within the viscous ribbon 402, a surface characteristic at a major surface of the viscous ribbon 402, etc. In addition, the processing apparatus 401 can facilitate removal of segments of the viscous ribbon 402 that comprise defects. For example, the processing apparatus 401 can identify segments within the viscous ribbon 402 that comprise defects, and track these segments based on a measured velocity of the viscous ribbon 402. By tracking these defect-containing segments, the processing apparatus 401 can indicate to an operator, following separation of the defect-containing segment, which of the defect-containing segments should be removed. Further, the processing apparatus 401 can also determine a location of the defect within the segment. As such, the operator can verify that the proper defect-containing segment has been removed by comparing the actual location of the defects (e.g., a distance from the edges of the segment) to a location determined by the processing apparatus. The operator can further verify that the defects and the artifacts within the segment have been properly classified.

Embodiments and the functional operations described herein can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" or "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of exemplary semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described herein can be implemented on a computer comprising a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer comprising a graphical user interface or a Web browser through which a user can interact with implementations of the subject matter described herein, or any combination of one or more such back end, middleware, or front end components. The components of the system can be interconnected by any form or medium of digital data communication, e.g., a communication network. Embodiments of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and comprising a client-server relationship to each other.

As used herein the terms "the," "a," or "an," mean "one or more," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof shall be construed as synonymous and open-ended, unless otherwise indicated.

While various embodiments have been described in detail relative to certain illustrative and specific embodiments thereof, the present disclosure should not be considered limited to such, as numerous modifications and combinations of the disclosed features are envisioned without departing from the scope of the following claims.

What is claimed is:

1. A method of processing a viscous ribbon comprising:
   supplying a molten material from a supply vessel;
   forming the molten material into the viscous ribbon, the viscous ribbon traveling along a travel path;
   receiving thermal light energy produced from the viscous ribbon;
   generating an image of the viscous ribbon from the thermal light energy; and
   detecting a defect of the viscous ribbon from the image, the detecting comprising determining a position of the defect.

2. The method of claim 1, wherein the generating comprises rectifying the image to a perspective that is orthogonal to a plane defined by the viscous ribbon.

3. The method of claim 1, wherein the detecting comprises determining if the defect is an inclusion within the viscous ribbon or a surface characteristic at a major surface of the viscous ribbon.

4. The method of claim 1, further comprising tracking a first segment of the viscous ribbon, which comprises the defect.

5. The method of claim 4, wherein the tracking comprises measuring a first velocity of the viscous ribbon.

6. The method of claim 5, further comprising removing the first segment from the viscous ribbon downstream from a portion of the viscous ribbon that is imaged.

7. The method of claim 1, further comprising generating the thermal light energy from one or more of the viscous ribbon or the supply vessel.

8. A method of processing a viscous ribbon comprising:
   supplying a molten material from a supply vessel;
   forming the molten material into the viscous ribbon, the viscous ribbon traveling along a travel path;
   receiving thermal light energy produced from the viscous ribbon;
   generating an image of the viscous ribbon from the thermal light energy;
   identifying an area of interest in the image; and
   determining if the area of interest comprises a defect of the viscous ribbon.

9. The method of claim 8, wherein the determining comprises measuring a first velocity of the viscous ribbon and a second velocity of the area of interest.

10. The method of claim 9, wherein if the first velocity is substantially equal to the second velocity, then classifying the area of interest as comprising the defect.

11. The method of claim 8, wherein the determining comprises identifying the area of interest in consecutive images of the viscous ribbon.

12. The method of claim 11, wherein if the area of interest is in consecutive images of the viscous ribbon, then classifying the area of interest as comprising the defect.

13. The method of claim 8, further comprising separating the viscous ribbon downstream from a portion of the viscous ribbon that is imaged.

14. The method of claim 8, further comprising generating the thermal light energy from one or more of the viscous ribbon or the supply vessel.

15. The method of claim 8, wherein the generating the image of the viscous ribbon comprises rectifying the image to a perspective that is orthogonal to a plane defined by the viscous ribbon.

16. A method of processing a viscous ribbon comprising:
   moving the viscous ribbon along a travel path in a travel direction;

receiving thermal light energy produced from the viscous ribbon;

generating an image of the viscous ribbon from the thermal light energy;

detecting a defect of the viscous ribbon from the image; and removing from the viscous ribbon a first segment of the viscous ribbon that comprises the defect.

17. The method of claim 16, further comprising tracking the first segment by measuring a first velocity of the viscous ribbon.

18. The method of claim 16, wherein the detecting comprises determining if the defect is an inclusion within the viscous ribbon or a surface characteristic at a major surface of the viscous ribbon.

19. The method of claim 16, wherein the detecting comprises determining a position of the defect.

* * * * *